June 16, 1925.

T. MIDGLEY

TIRE MOLD 1,542,798

Original Filed March 2, 1923

INVENTOR.
Thomas Midgley
BY
Edward C. Taylor
ATTORNEY.

Patented June 16, 1925.

1,542,798

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed March 2, 1923, Serial. No. 622,264. Renewed April 27, 1925.

*To all whom it may concern:*

Be it known that I, THOMAS MIDGLEY, a citizen of the United States of America, residing at Hampden, in the county of Hampden and State of Massachusetts, have invented certain new and useful Improvements in Tire Molds, of which the following is a specification.

The present invention relates to improvements in molds adapted for vulcanizing rubber articles such, for example, as tire casings, and is particularly directed to the improvement of such molds in economy of operation, low cost, and lightness. It finds particular utility with molds intended to be used under internal pressure.

Figure 1:
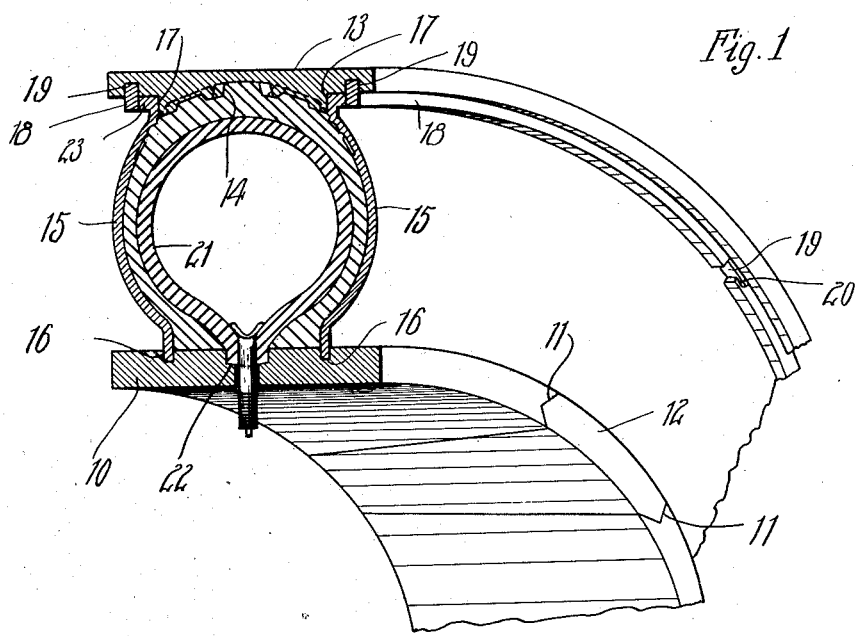
Figure 2:
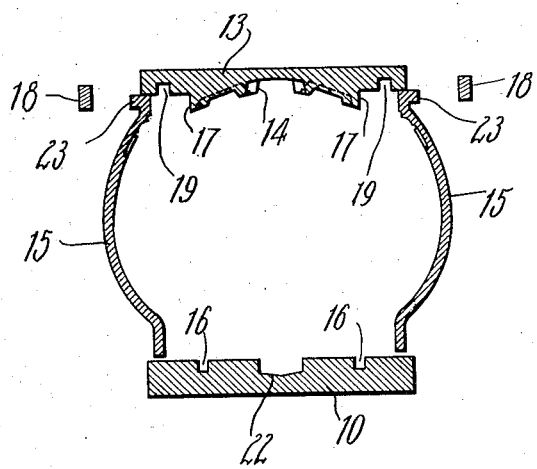

The invention will now be described in connection with the accompanying drawings, in which Fig. 1 is a sectional view of a mold constructed in accordance with my invention; and Fig. 2 is a view thereof with the parts separated.

In copending applications Serial Nos. 621,425, filed Feb. 26, 1923, and 622,491, filed March 3, 1923, I have described molds having certain features in common with that described herein. I have claimed such common or generic features in those applications, the present case being directed to certain modifications which will now be considered.

The mold as shown in the specific embodiment illustrated has an annular base portion 10, split as shown at 11, the split being closed by a wedge 12 suitably dovetailed or beveled to make a tight and stable fit. The mold has also a tread ring 13, which may be engraved or otherwise formed at 14 to impress upon the tire to be vulcanized the desired pattern. This piece may conveniently be formed endless. The mold also has side plates 15, suitably formed to the configuration of the tire. These plates are preferably sheet steel stampings, smoothed and buffed if necessary on their inner surface to give a smooth appearance to the tire. The inner edges of the plates fit in grooves 16 in the base ring 10, and their outer edges fit against shoulders 17 on the tread ring, where they are held in place by snap rings 18 fitting in grooves 19 in the tread ring. Wedge 12 is formed with a continuation of the grooves 16. The snap rings may conveniently be provided with a shoulder or notch 20 for the insertion of a screw driver or other tool by which the ring may be snapped out of its receiving groove. The tire, if of the cord type, is generally cured under expansive fluid pressure exerted through an annular bag 21. To receive this bag the base portion may be left flat transversely, or it may be recessed at 22 to receive the base of the bag. The latter construction is preferable, as the pressure exerted by the bag against the beads of the tire is more uniform. The outer edges of the side plates are preferably bent as at 23 to give space for the removal of the snap rings.

A mold so constructed is readily assembled and disassembled. Assuming a tire to have been vulcanized in the mold, it is removed as follows. By driving out wedge 12 the base ring can be collapsed sufficiently to free its grooves 16 from the edges of the side plates, and can then be withdrawn laterally. One or both of the snap rings 18 being sprung out of their retaining grooves, one or both, as the case may be, of the side plates can be removed from the tread ring. The tire may now be pried free of the tread ring and removed. The operation of assembly is conducted in a reverse manner.

A mold so constructed has numerous advantages over molds of previous types. In the first place it can be made partially or entirely of rolled, pressed, or forged sheet steel, permitting a great decrease in the weight of the assembled mold. This is of importance not only in ease of handling and cost, in which features it far surpasses molds now in use, but also in the saving of steam or other heating means during vulcanization. In the vulcanization of molded rubber goods it is of course necessary to heat the mold along with the rubber, and to cool off the mold to permit handling after the vulcanization has been completed. The heat used in bringing the metal of the mold to the temperature of vulcanization is wasted, and is eliminated by the present invention to the extent that the amount of metal is reduced.

Having thus described my invention, I claim:

1. A mold for the vulcanization of tire casings having a split base ring, a wedge joining the ends of such ring, a tread ring formed to the pattern of the tread portion of the tire, a pair of side plates fitting at their inner edges into grooves in the base ring and wedge and at their outer edges against shoulders on the tread ring, and snap rings fitting into grooves in the tread ring and serving to hold the side plates against the shoulders, whereby a rigid assembly of all the recited parts is produced.

2. A mold for the vulcanization of tire casings comprising a split base ring having circumferential grooves therein, a wedge joining the ends of such ring, a tread ring, a pair of pressed steel side plates fitting into the grooves, and means for holding the side plates in position relative to the tread ring.

3. A mold for the vulcanization of tire casings comprising a base ring transversely split and having circumferential grooves therein, a pair of side plates of substantially uniform thickness adapted to fit into said grooves, means for holding the base ring in engagement with the side plates, a tread ring, and means for holding the side plates in engagement with the tread ring.

THOMAS MIDGLEY.